US011309823B2

(12) United States Patent
Tservil

(10) Patent No.: US 11,309,823 B2
(45) Date of Patent: Apr. 19, 2022

(54) THREE PHASE MOTOR CONTROL WITH VARIABLE RPM AND VARIABLE SYNCHRONIZED PWM

(71) Applicant: Yefim Tservil, Scarsdale, NY (US)

(72) Inventor: Yefim Tservil, Scarsdale, NY (US)

( * ) Notice: Subject to any disclaimer, the term of this patent is extended or adjusted under 35 U.S.C. 154(b) by 0 days.

(21) Appl. No.: 16/920,171

(22) Filed: Jul. 2, 2020

(65) Prior Publication Data

US 2022/0006413 A1    Jan. 6, 2022

(51) Int. Cl.
*H02P 5/00* (2016.01)
*H02P 27/08* (2006.01)
*H02P 29/60* (2016.01)

(52) U.S. Cl.
CPC ............ *H02P 27/085* (2013.01); *H02P 29/60* (2016.02)

(58) Field of Classification Search
CPC .............................. H02P 27/085; H02P 29/60
USPC .................................................. 318/811, 268
See application file for complete search history.

(56) References Cited

U.S. PATENT DOCUMENTS

| | | | | |
|---|---|---|---|---|
| 4,977,395 | A | * 12/1990 | Bozeman, Jr. | ........... G01H 1/00 340/683 |
| 2005/0099147 | A1 | * 5/2005 | Miettinen | ............... H02P 29/60 318/268 |
| 2014/0183184 | A1 | * 7/2014 | Oh | ......................... H05B 6/065 219/662 |
| 2020/0408852 | A1 | * 12/2020 | Kishibe | ................. H02P 29/024 |

* cited by examiner

*Primary Examiner* — Kawing Chan
*Assistant Examiner* — Zemenay T Truneh

(57) ABSTRACT

The three phase motor control with variable RPM and variable synchronized PWM is a new concept or method to drive a DC/AC invertor is a triggering pulse revolving circuit having a variable speed of revolving output triggering pulses to rotate commutating and duty cycling circuits to enable/disable power mosfets and to rotate current directions in three phase induction motor stator coils. The RPM control and PWM control are simplified using this method. All interconnections between circuits are conventional, not traditional.

4 Claims, 3 Drawing Sheets

THREE PHASE MOTOR CONTROL WITH VARIABLE RPM AND VARIABLE SYNCHRONIZED PWM

BACKGROUND OF THE INVENTION

Given insight composite work comprises well-known product descriptions from a few United States companies. These incorporate basic electronic postulates in electrical DC/AC conversion. Simplification in a process of induction motor drives from a battery is the reason of this declaration.

BRIEF SUMMARY OF THE INVENTION

The work is a representation of an assembly from different existing axioms, and in the end it is a new concept or a method to control induction motors, using components which were produced a few decades ago, such as timers, opto-couplers, diodes, DC/AC converters, and digital potentiometers.

The new concept or method to drive a DC/AC invertor is a triggering pulse revolving circuit having variable speed of revolving output triggering pulses to rotate commutating and duty cycling circuits to enable/disable power mosfets and to rotate current directions in three phase induction motor stator coils. The RPM control and PWM control are simplified using this method. All interconnections between circuits are conventional, not traditional.

The description of a circuit, as noted in attached FIG. 208, from the National SemiConductor Linear Application Specific IC's Databook, pages 8-44, contains three precision timers connected in a line as a train with an input to output connection. The circuit produces three pulses in a sequence after the input on the first timer is initiated.

To have a continuous line of six timers, the last output pin from the first three timers needs to be connected to the first triggering pin of the second line of the three, then six pulses will be produced in an assembled circuit.

Connecting the timers as a talking ring mode, where the sixth output pin is connected to the first timer triggering pin, it will make the ring circuit wok continuously, shifting the triggering pulse around in a circular mode (revolving process in the timing assembly).

A1 refers to the Variable Reluctance Magnetic Pick Up;
A2 refers to Discharge; A3 refers to Threshold;
A4 refers to Modulation Input;
A5 refers to Output, and A6 refers to Trigger.

Figure 1:
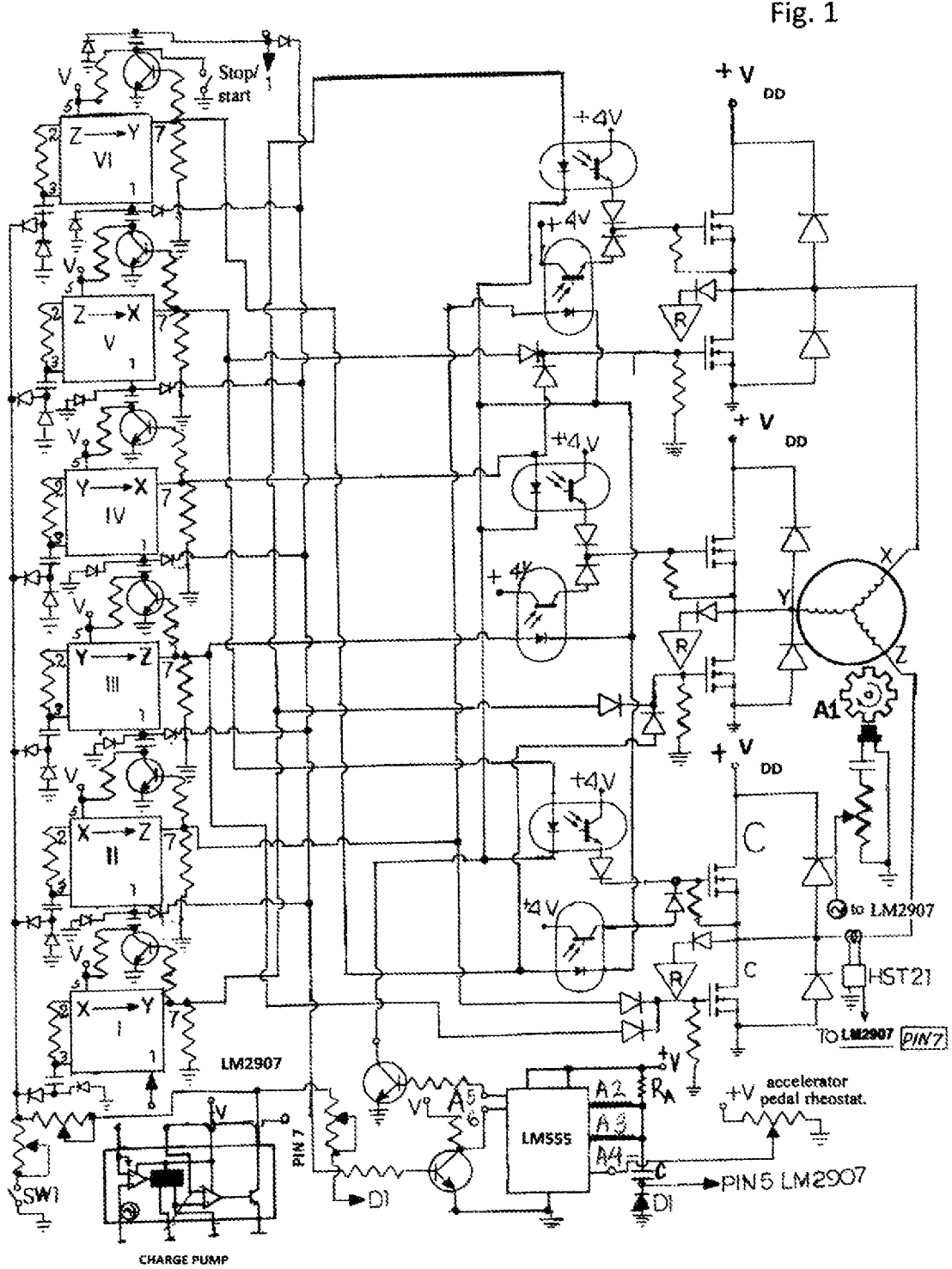
FIG. 1 is a schematic of circuits for variable speed and current density control of the three phase induction motor. Some references have been minimized as follows.
Figure 2:
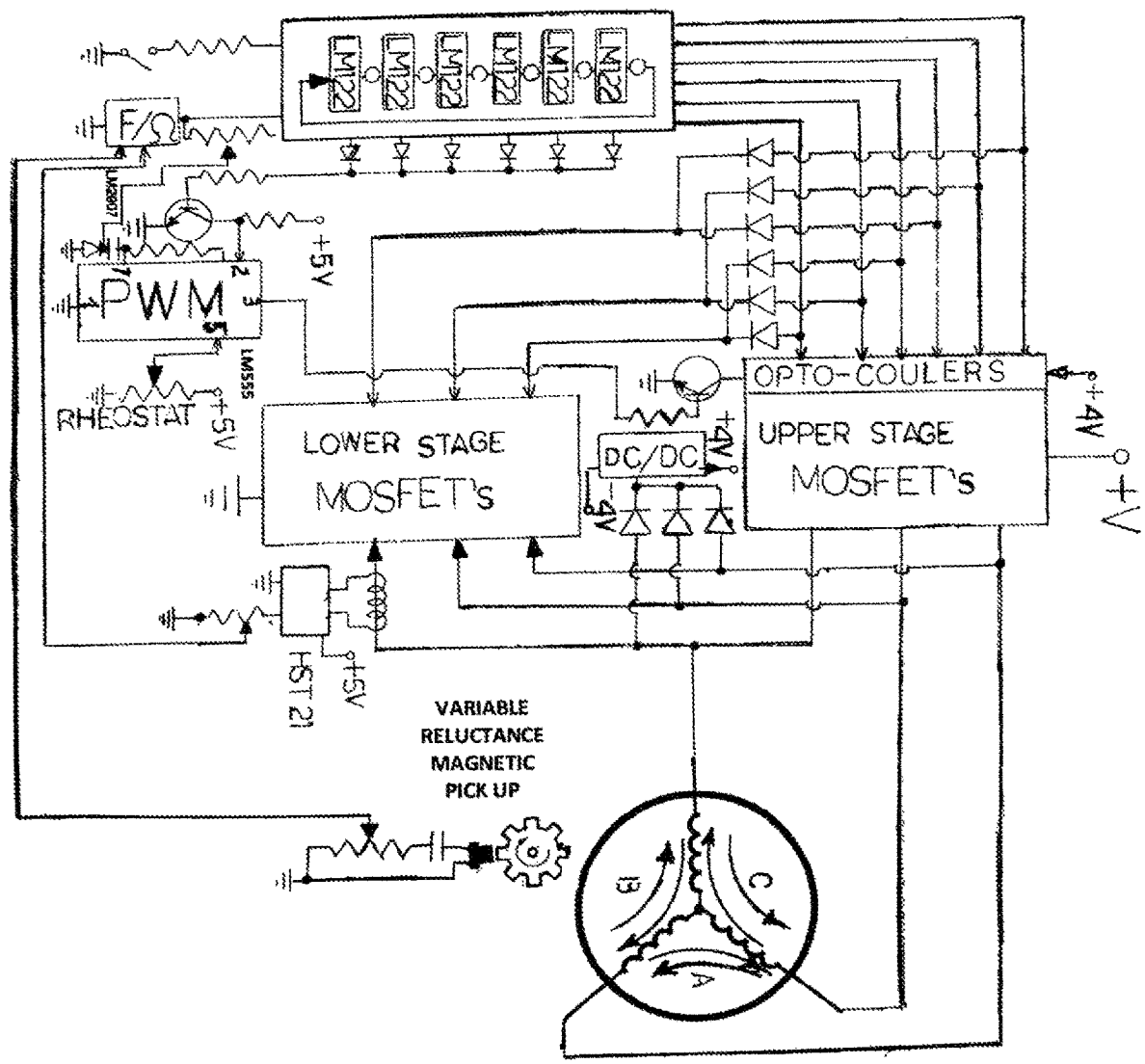

FIG. 2 is a system concept for variable speed and current density control of the three phase induction motor.

Figure 3:
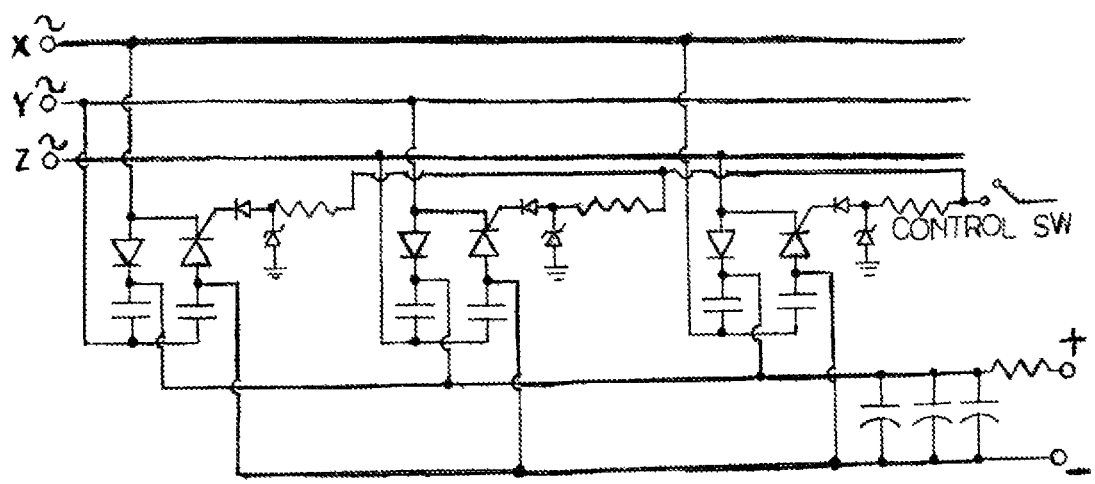

FIG. 3 is a voltage boost circuit comprised of three voltage doublers for charging energy to a storage collector.

DETAILED DESCRIPTION OF THE INVENTION

A DC/AC inverting process with signal control and pulse distributing circuit is a reliable and simplified method for spinning the magnetic flux in the stator of a three phase asynchronous motor. Using a variable speed of a pulse rotation circuitry is not a traditional method and it is assembled from six conventional timers LM122 made by Texas Instruments corp. The starting RPM at a pulse rotating assembly should be calibrated for a soft start at the rotor rotation (~20 Hz). The PWM circuit controls the upper stage drivers through switching transistor for variable current density and economical energy use from the DC source. The speed of the motor's rotor is picked up by a variable reluctance magnetic pickup circuit as a rotor attachment and is processed by the LM2907 circuit which in this case is connected as 'F' to 'I' converter. A variable current (~I) produced by LM2907 as a comparator circuit regulates the RPM's in the timer's assembly. In this case the variable reluctance magnetic pickup circuit serves as a rotor attachment and is the feedback regulator for the pulse distributing circuit. The PWM circuit is controlled manually by a rheostat and it is synchronized by synchro-pulses generated from the pulse distributing triggering circuitry through six signal diodes. The differences between frequency in a variable reluctance magnetic pickup circuit and pulse distributing circuitry should be calibrated by a technician to adjust the right level sensing rotor slip in the induction motor. Because the upper stage switchers from the inverter are not connected directly to the ground, opto-coupler drivers are situated to drive the gates with a separate +4V DC/DC converter, where +4V is a voltage supply for opto-couplers switching elements. Each opto-coupler anode is tied to an enabling single output (pin #7 LM122) from a pulse distributing circuit and all opto-couplers cathodes are tied to a PWM controller's switching transistor to switch opto-coupler cathodes to the ground. In this situation the upper stage switchers from the inverter are controlled by a PWM controller are through switching transistor which causes the current density to vary in motor stator coils. Less current density in stator coils will cause less torque, resulting in less RPM's at motors rotor and lower frequency at the pulse distributing control circuit. In the case when low turning frequency in stator coils and high torque at rotor is needed (heavy start), the comparator at pin #7 receives from the current sense circuit (HST21) a differential signal which is adjusted to suppress the output regulated current through the LM2907 output transistor. The six timers are assembled as a talking ring circuit and a triggering circuit is placed between each other. The next timer reacts to the trigger only and only when the previous timer switches itself off. Then after releasing a triggering pulse the trigger becomes active only when the previous timer is 'on' again. Each timer reset and holds time is ⅙ from the full pulse rotating period. The rotating timing is variable to accelerate/decelerate from the motors rotors RPM's and LM2907 circuit as a feedback RPM's sensor (rotor attachment). To stop the pulse rotating, an analog switch is placed to switch one of the triggers to the ground. To restart the process, the switch must be turned off. LM2907 is connected as an F/I converter.

The torque produced by the induction motor is directly proportional to induction motor slip. At no load the slip is at minimum level. Slip increases when stiff conditions and resistance increases at the rotors shaft causing the current to increase in the stator coils and the current sense circuit will produce a higher output voltage to the comparator in LM2907 (pin #7). As a result, the output transistor at LM2709 correspondingly reduces the current flow to Ct through a charging diode, slowing down the pulse rotating assembly. As the pulse rotating decelerates then 'f' decreases in stator coils, and correspondingly 'Ip' increases.

$$I_p = \frac{V_p}{2\pi fL}$$

Having a manual PWM control with the rheostat at LM555, the circuit is able to regulate the torque and current consumption by starting at 20 Hz with a current density ~17%. At 50-60 Hz the current density varies between 40% and 60% depending upon the resistance of the rotor torque. VOLTAGE BOOST CIRCUIT: In the case when 'f' in Hz numbers exceed over 60 Hz at inverting circuit, the amplitude in the voltage must increase. In this situation voltage doublers with large capacitance in Farads units are tied to each phase at the DC/AC inverter. The three voltage doublers are pumping in current to an energy storage collector which comprise three large numbers in Farads units capacitors. Accumulated energy in those large capacitance storage will bleed down to the DC source through a high current resistor, which serves as a current limiter. This accumulated energy with doubled voltage is generated to overcome the reactive resistance in stator coils when the frequency reaches over 60 Hz.

The invention claimed is:

1. A motor control apparatus for initiating optocoupler-drivers to drive gates of power switchers at an inverter for magnetic flux rotation in a three phase induction motor stator, comprising:
   a circuit including:
      six optocouplers; and
      six precision timers, each precision timer including an output transistor;
      wherein the six precision timers are divided into
         a first set of three precision timers; and
         a second set of three precision timers, wherein a last output pin from the first set of three precision timers is connected to a first triggering pin of the second set of three precision timers, the first set of three precision timers and the second set of three precision timers configured to output six output pulses, and wherein the first set of three precision timers and the second set of three precision timers are connected as a talking ring mode, wherein an output pin of a last timer of the second set of three precision timers is connected to a triggering pin of a first timer of the first set of three precision timers,
      wherein each precision timer comprises a synchro pulse trigger tied between an output/input of each timer and a timing control RC circuit configured to control RPM variations, of a motor being controlled, according to a 'V/I' output on a collector at an odometer circuit, where 'V/I' is equivalent to R and f=½πRC, where R is a Resistance, C is a Capacitance, and 'f' is a frequency, wherein each timing control RC circuit at each respective precision timer is activated from a single pulse coming in time when a previous respective timer in the assembly from six timers turns OFF its output transistor
      wherein, the output from each precision timer is connected to an anode of an optocoupler, the output from each precision timer serving as a +5V voltage source for a single LED in each optocoupler
      where each optocoupler includes a cathode and a switching element serving as a gate driver to the power switchers in the upper stage of the inverter, wherein the power switchers at the inverter are arranged in sequence to turn on a DC current in stator coils . . . a rotor with a respective torque;
      a collector of the switching transistor is connected to said six cathodes of said six optocouplers, and
      a general purpose timer configured as a pulse width modulator connected to said switching transistors for duty cycle control and switching cathodes to ground which is serving as a −5V terminal from a respective 5V voltage source;
      wherein said switching transistors are configured to switch all said cathodes to ground serving as a switch to −5V when the LED's in the optocouplers are driven in a synchronized time from a synchro-pulse sent from a single trigger to the general purpose timer; and
      wherein the general purpose timer is regulated by a rheostat and is synchronized with each precision timer receiving a synchro pulse from a triggering circuit of each precision timer.

2. The motor control apparatus according to claim 1, further comprising:
   three current return diodes,
   wherein the switching elements of the optocouplers are located in an upper stage; and
   wherein each current return diode is coupled to a respective +4V source and serves as a −4V terminal and is configured as a separate ground for a respective said optocouplers-drivers in said upper stage single power switching element, wherein each current return diode is serving as separate −4V return element, and the +4V terminal is connected to a collector at internal phototransistor in the optocoupler-driver, then its emitter is connected to the gate of an power switching element to drive that gate through that emitter and means through current return diodes to −4V terminal wherein one current return diode serves for two phototransistors gate drivers.

3. The motor control apparatus according to claim 1, wherein each timing control RC circuit in precision timer circuit and is connected through a charging diode to the collector of an output transistor from the odometer circuit where the output transistor serves as a variable resistor in a conversion process of 'f' to 'V/I and RC time variations in a respective precision timer circuit follows variations in 'V/I', said variations resulting in a pulse rotating speed at a respective precision timer varies simultaneously with V/I variations and 'V/I' is equivalent to R where f=½πRC, and the charging diode are providing the current flow to the C.

4. The motor control apparatus according to claim 1, further comprising:
   a voltage boost circuit, the voltage boost circuit comprising:
      an inverter configured to generated three phases;
      three voltage doublers, each voltage doubler connected to a corresponding one of the three phases generated by the inverter,
      wherein the voltage boost circuit is configured to boost the primary conductance according to the following formula:

$$I_p = V_p 2\pi fL$$

wherein lp is a primary conductance, $V_p$ is a primary voltage, f is the frequency in Hz, and L is inductance;
   wherein at high rotor RPMs, f in the stator coils is at a high level causing reactive resistance and wherein boosting V causes I to respectively increase.

* * * * *